(12) United States Patent
Zimmerlee

(10) Patent No.: US 7,556,544 B2
(45) Date of Patent: Jul. 7, 2009

(54) DUAL PROPULSION STEERING AND CONTROL SYSTEM FOR WATERCRAFT

(76) Inventor: John Preston Zimmerlee, 3342 Brickey Ln, Marietta, GA (US) 30068-3844

( * ) Notice: Subject to any disclaimer, the term of this patent is extended or adjusted under 35 U.S.C. 154(b) by 0 days.

(21) Appl. No.: 12/214,779

(22) Filed: Jun. 23, 2008

(65) Prior Publication Data

US 2009/0042465 A1 Feb. 12, 2009

Related U.S. Application Data

(63) Continuation of application No. 11/609,142, filed on Dec. 11, 2006, now abandoned.

(51) Int. Cl.
*B60L 15/20* (2006.01)
(52) U.S. Cl. .................. 440/7; 114/153; 440/1
(58) Field of Classification Search .................. 114/153, 114/363; 440/1, 6, 7
See application file for complete search history.

(56) References Cited

U.S. PATENT DOCUMENTS

| | | | |
|---|---|---|---|
| 2,213,520 A | 9/1940 | Gentry | |
| 2,993,463 A * | 7/1961 | McKinney | 440/41 |
| 3,602,181 A * | 8/1971 | Harris | 114/153 |
| 3,995,579 A | 12/1976 | Childre | |
| 4,311,108 A | 1/1982 | Horton | |
| 4,587,388 A | 5/1986 | Cavin | |
| 4,631,034 A | 12/1986 | Menne | |
| 4,702,713 A | 10/1987 | Lee | |
| 4,722,706 A | 2/1988 | Young | |
| 4,730,571 A | 3/1988 | Hedlund | |
| 4,950,187 A | 8/1990 | Smith | |
| 5,131,875 A | 7/1992 | Lee | |
| 5,181,868 A * | 1/1993 | Gabriel | 440/38 |
| 5,465,633 A | 11/1995 | Bernloehr | |
| 6,132,267 A * | 10/2000 | Campbell | 440/6 |
| 6,431,926 B1 * | 8/2002 | Rosefsky | 440/48 |

* cited by examiner

*Primary Examiner*—Lars A Olson

(57) ABSTRACT

A dual propulsion steering and control system for a watercraft which utilizes simple movement of an operator's feet to independently vary thrust from a pair of propulsion units, each mounted on opposite sides of the centerline of a watercraft. By varying the amount and direction of thrust on each side, the watercraft may be steered in a multitude of directions, propelled at varying speeds, and turned completely around in a short distance.

20 Claims, 7 Drawing Sheets

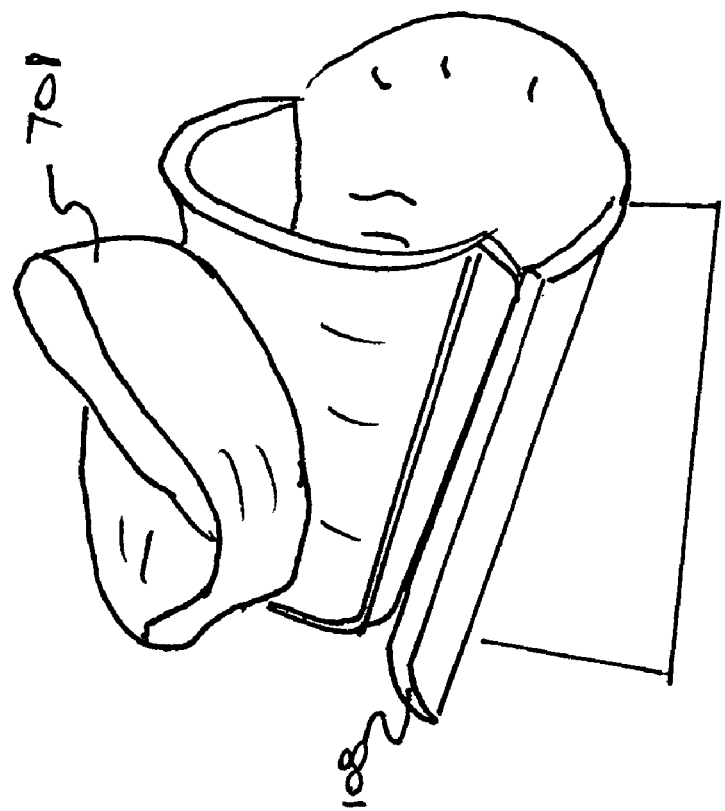
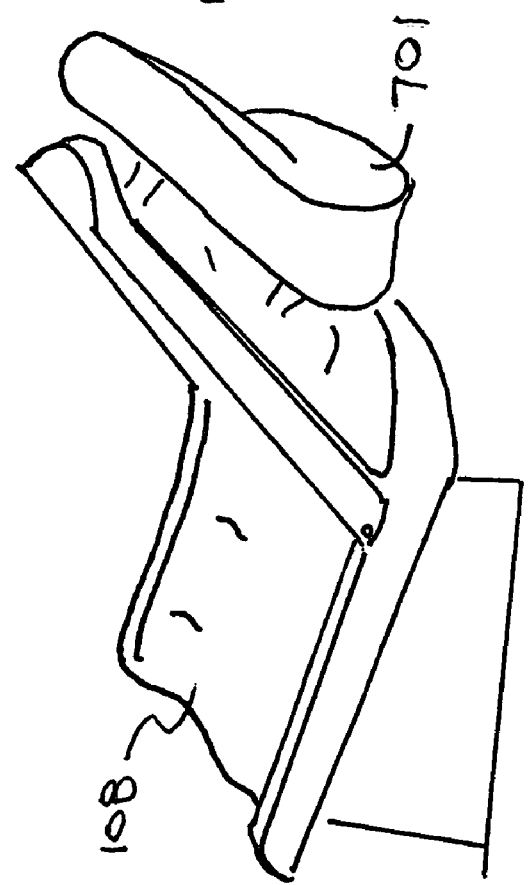
FIG 7

DUAL PROPULSION STEERING AND CONTROL SYSTEM FOR WATERCRAFT

CROSS-REFERENCE TO RELATED APPLICATIONS

This is a Substitute Specification to application Ser. No. 12/214,779, filed Jun. 23, 2008. This is a continuation of application Ser. No. 11/609,142, filed Dec. 11, 2006, now abandoned.

BACKGROUND OF THE INVENTION

1. Field of Invention

This invention is generally directed to propulsion, steering, and control devices for watercraft and, more specifically, to such devices which utilize a pair of independently operable engines or motors with propellers or other drives to provide both the thrust and steering capability for the craft and which includes separate foot controls to independently vary an amount and direction of thrust from the propellers or drives, each mounted on opposite sides of the watercraft's centerline, for the purpose of controlling the forward/rearward direction, speed, and steering of the watercraft. The invention is also directed to various other power converters and propulsion means.

2. History of the Related Art

Over the years there have been a number of innovations directed to enabling watercraft to be powered and steered by propulsion systems. Many of these systems are specifically designed to facilitate the use of watercraft for specific outdoor activities and thus utilize controls which are manipulated by an operator's feet so that the operator's hands remain free for the use of fishing or other equipment.

Most of these systems control the speed and/or direction of common trolling motors with standard propellers which perform reasonably well if the propellers are located at least a propeller diameter distance under the water's surface. Any less depth creates cavitation and/or ventilation of the propeller (lots of noise, little or no performance). Propellers (or props) usually consist of a set of two or more twisted, airfoil-shaped blades mounted around a shaft. Each face of the blade has surface area which is less than the total surface area within the diameter of the propeller. Most propellers are approximately three times more efficient in forward motion than in reverse.

Only a few of these systems are designed to control power driven augers (Archimedes Screws). It should be noted that augers, as opposed to propellers, have one or more helical flanges, also known as flighting, normally mounted around a shaft. Each face of flange has surface area which is more than the total surface area within the diameter of the auger. Simple augers perform equally well in forward and reverse motions and are less susceptible to cavitation and ventilation. Prior art is limited in addressing other alternative propulsion means, including but not limited to, pumps, jets, and turbines whereby foot controls are utilized for differential steering.

In 1956, U.S. Pat. No. 2,764,117 to Persia discloses a vehicle propelled by 2 auger type rotors, but the boat is human powered through foot pedals, the augers cannot operate individually, and steering is done by rudder attached to a steering wheel.

In 1964, U.S. Pat. No. 3,116,602 to Dahle describes a single hydro jet operating in one direction with a clamshell thrust diverter to accomplish reverse motion.

U.S. Pat. No. 2,213,520 to Gentry discloses a foot control system which incorporates two separate electrical motors which are mounted to the two opposite sides of a boat or watercraft. Wherein, it is possible to use reverse propulsion of one motor relative to the other in order to assist in turning the boat about itself. Unfortunately, only the direction, not the speed, may be controlled. Therefore, precise control is limited.

U.S. Pat. Nos. 2,804,838 to Moser and 6,758,705 to Bechtel disclose systems utilizing a foot control but are limited to a single propulsion unit.

U.S. Pat. No. 4,537,144 to Horton describes a propelled watercraft using two trolling motors and on-off pressure switches mounted on a portable support, but not foot controlled.

Yet another device, U.S. Pat. No. 3,995,579 to Childre, discloses a pair of reversible electric motors mounted in a fixed angle relationship to each other on a single shaft. Unfortunately, the foot plate is operated by one foot and rockers to each of four corners to actuate forward right motor, reverse right motor, forward left motor, or reverse left motor. To change speed, the foot must be lifted from the plate and moved to the speed control wheel. Again, precise control is limited.

In 1986, U.S. Pat. No. 4,631,033 to Meene describes a foot control whose rocker pedal controls the rotation of the shaft of a single early model trolling motor and thus the steering of the boat. This invention is not intuitive and controls only one motor. A separate toe wheel controls speed.

In 1987, U.S. Pat. No. 4,702,713 to Bruce Lee recognized that a commonly available foot pedal control could be mounted on a plate that slides on a track to keep the pedal in proximity with an operator's foot when the operator is swiveling in a chair. It did not address multiple pedals or multiple motors.

In 1988, U.S. Pat. No. 4,722,706 to Young revealed that Bruce Lee's sliding plate could be put on wheels to function better, but still did not address multiple controls or motors.

In 1990, U.S. Pat. No. 4,950,187 to Smith used a motor and screw to rotate the shaft on a single trolling motor. Again this did not use foot controls to differentially steer multiple motors.

More relative and in 1992, U.S. Pat. No. 5,131,875 to Warren D. Lee discloses a propulsion and steering system for dual motors, especially of the trolling motor type, which incorporates a pair of foot pedals which are electrically connected between a battery and the motors and which are operable to independently control the direction of thrust and speed of the motors so that the motors are used to both propel and steer the boat. Lee's foot control means includes a foot pedal that has toe and heel portions and pivots about a single axis generally perpendicular to the elongated axis extending between said toe and heel portions (under the foot). Lee missed the opportunity to pivot the pedal about an axis closer to an operator's ankle for a more ergonomic and significantly longer sweep for more precise control. Lee also missed the opportunity to use a forward and rearward movement of the foot allowing longer travel resulting in a more precise speed control and comfortable operation.

SUMMARY OF THE INVENTION

This invention is directed to a dual propulsion steering and control system for watercraft and especially to such a system which incorporates a power source, a pair of power conversion means, a pair of propulsion means each located on either side of the centerline of the watercraft, and a pair of foot control means each connected to a power regulating means for independently varying the output of each power conversion means resulting in controlled thrust from each propulsion means. By positioning the foot control means, an operator may control forward and reverse direction, speed, and steering of the watercraft.

In a further embodiment of the present invention two basic variations of foot controls are described, one uses a pivoting motion, the other uses a forward and reverse motion.

It is a primary object of the present invention to provide a dual propulsion steering and control system for watercraft which enables the independent control of a pair of power conversion means and thus the connected propulsion means through individual foot control means which are connected to separate power regulating means which not only initiates activation of each power converter means independently of one another but also controls the direction of propulsion and the amount of thrust from each propulsion means whereby the speed, direction, and steering of the watercraft is positively controlled through the operation of the foot control means.

It is also an embodiment of the present invention to provide a control system for watercraft wherein a pair of power converting means, and thus, a pair of propulsion means are individually controlled through an operator's positioning of the foot control means with the thrust of each propulsion means being related to the independent amount of movement of the operator's feet.

It is further an object of the present invention to present alternatives for power sources, power converting means, foot control means, power regulating means, and propulsion means. Power sources may include, but are not limited to, batteries, compressed gases or liquids, fuels, and other stored energy. Power converting means may include, but are not limited to, trolling motors, electric motors, valves, engines, and hydraulic equipment. Foot control means may include, but are not limited to, heel pockets, foot plates, receptacles, pedals, rocker pedals, pivot assemblies, tracks, potentiometers, and switch means. Power regulating means may include, but are not limited to, switches, resistance wiring, relays, potentiometers, valves, and/or readily available electronic speed control components. Propulsion means may include, but are not limited to, propellers, augers, screws, power transmissions, impellers, jet drives, turbines, and pumps.

It is further an object of the present invention to provide a differential thrust steering system using a pair of individually controlled augers or Archimedes screws, each mounted on opposite sides of the centerline of a watercraft.

BRIEF DESCRIPTION OF DRAWINGS

FIG. 7 shows operator's seat with attached casting seat in normal low seating position as well as with seat back flipped forward exposing casting seat for higher seating position.

DESCRIPTION OF THE PREFERRED EMBODIMENT

Figure 1:
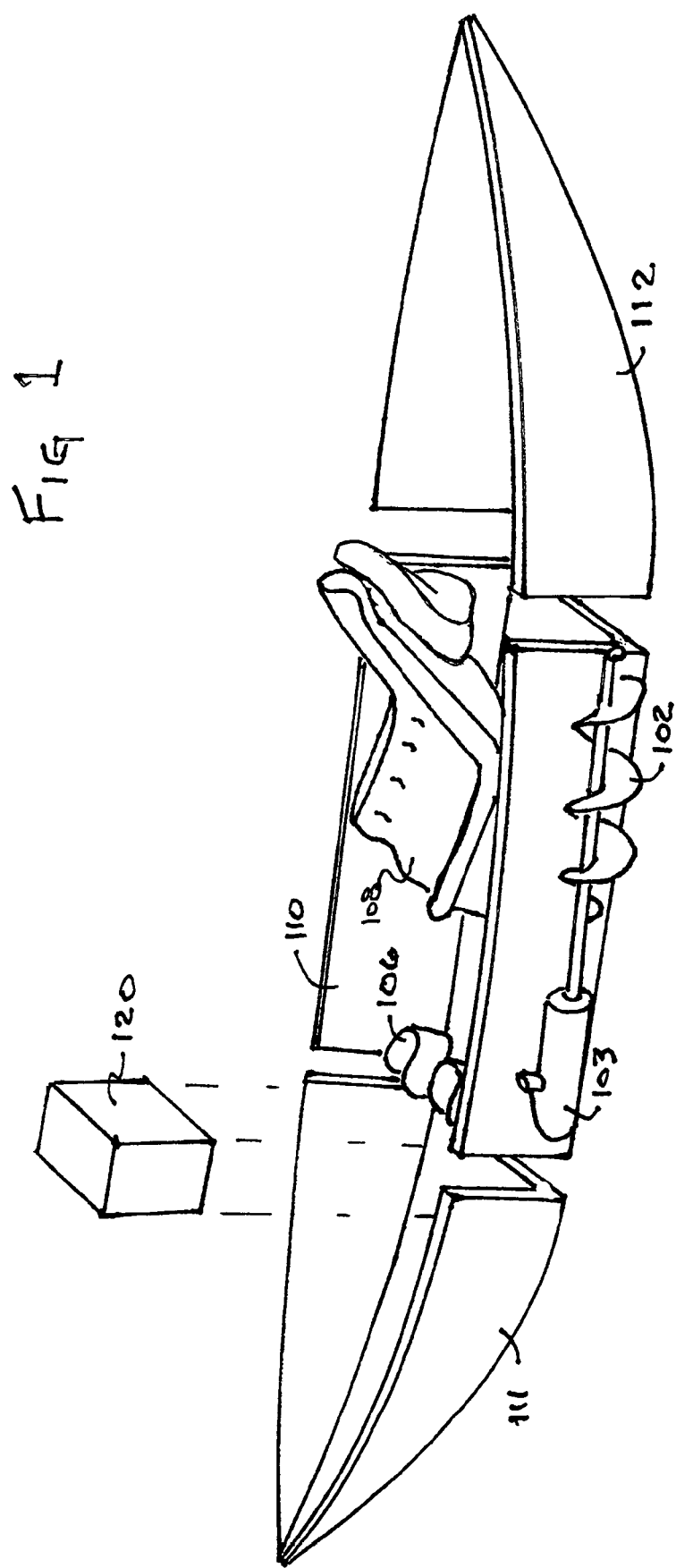
FIG. 1 is a perspective and exploded view of a typical watercraft with dual propulsion means showing power conversion means, propulsion means, power source, and foot receptacles of the present invention mounted thereto. It also depicts three possible modules of a watercraft.

With continued reference to the drawings, the dual propulsion steering and control system of the present invention is shown in FIG. 1 as being utilized with a small boat or watercraft which is shown as, but not limited to, a one person watercraft. Said watercraft is shown as three possible modules, a mid-section 110, a bow 111, and a stern 112. Also shown is an auger as a propulsion means 102, an electric motor as a power conversion means 103, a foot receptacle 106, an electrical battery as a power source 120, and an operator's seat 108.

Figure 2:
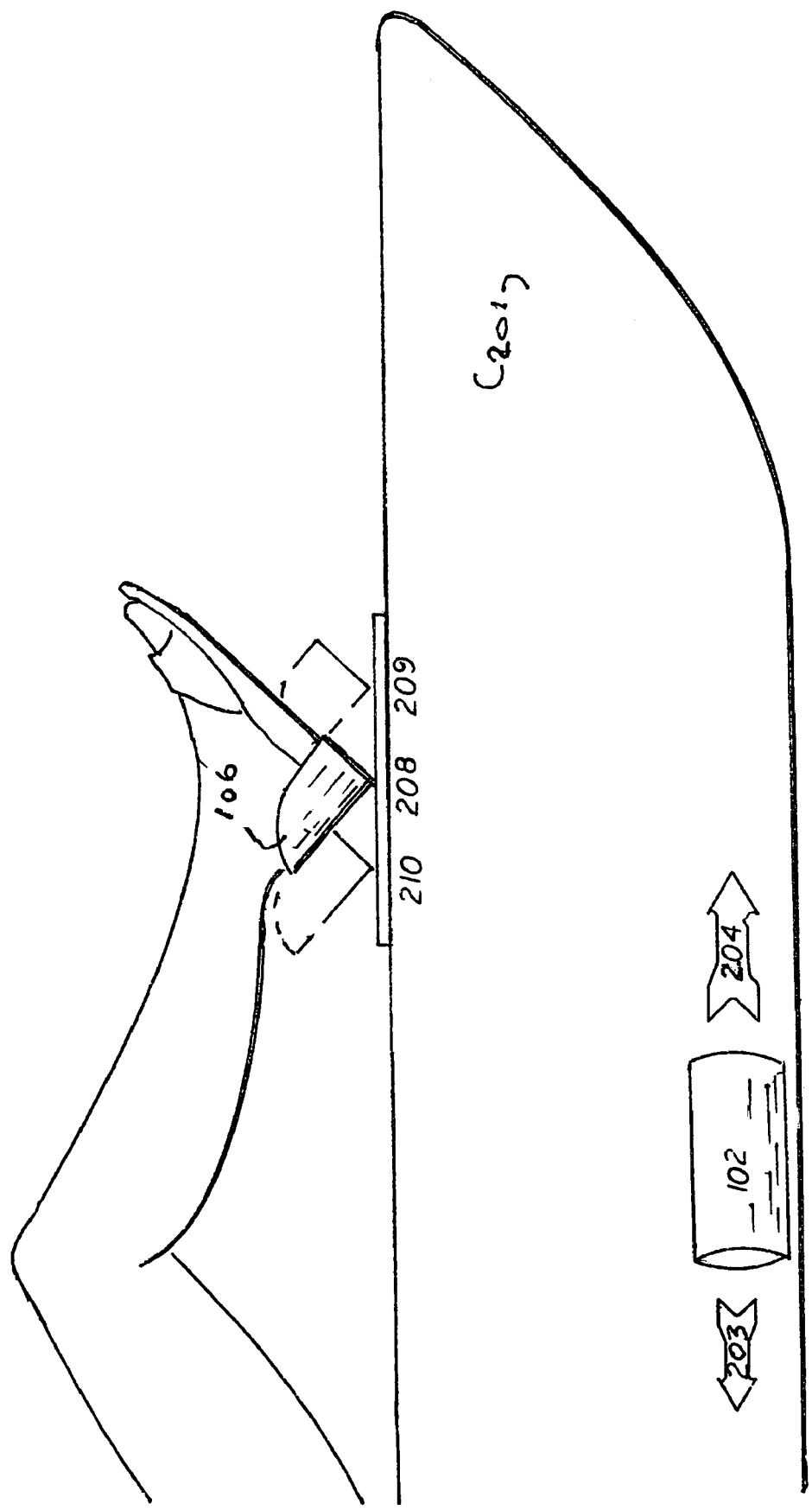
FIG. 2 is a side elevation of the typical watercraft of FIG. 1 showing foot receptacle, power conversion means, and propulsion means of the present invention mounted thereto.

The basic operation of the steering and control system is shown in FIG. 2. At rest, an operator's leg is relaxed and his foot rests in a foot receptacle 106, a portion of a foot control means not fully shown for simplicity, which is in a neutral position 208. At this position 208, no power is transmitted from the power source 120 through a power regulating means 401, shown in FIG. 4, to the power conversion means 103. As the operator pushes a left or right foot forward to position 209 and beyond, the corresponding power regulating means progressively delivers power from the source 120 to the corresponding power conversion means 103 to activate the connected propulsion means 102. The propulsion means delivers force in the proper direction 203 to move the corresponding side of the watercraft 201 forward at a progressive rate. A similar process takes place when the operator pulls back on a foot receptacle 106 with the operator's heel to position 210. As the receptacle 106 progressively moves rearward, the power regulating means receives power from the source 120 and progressively delivers the power to the corresponding power conversion means 103 activating propulsion means 102 which directs progressively more force in direction 204 which moves and increases speed of the corresponding side of the watercraft 201 in a rearward motion.

Figure 3:
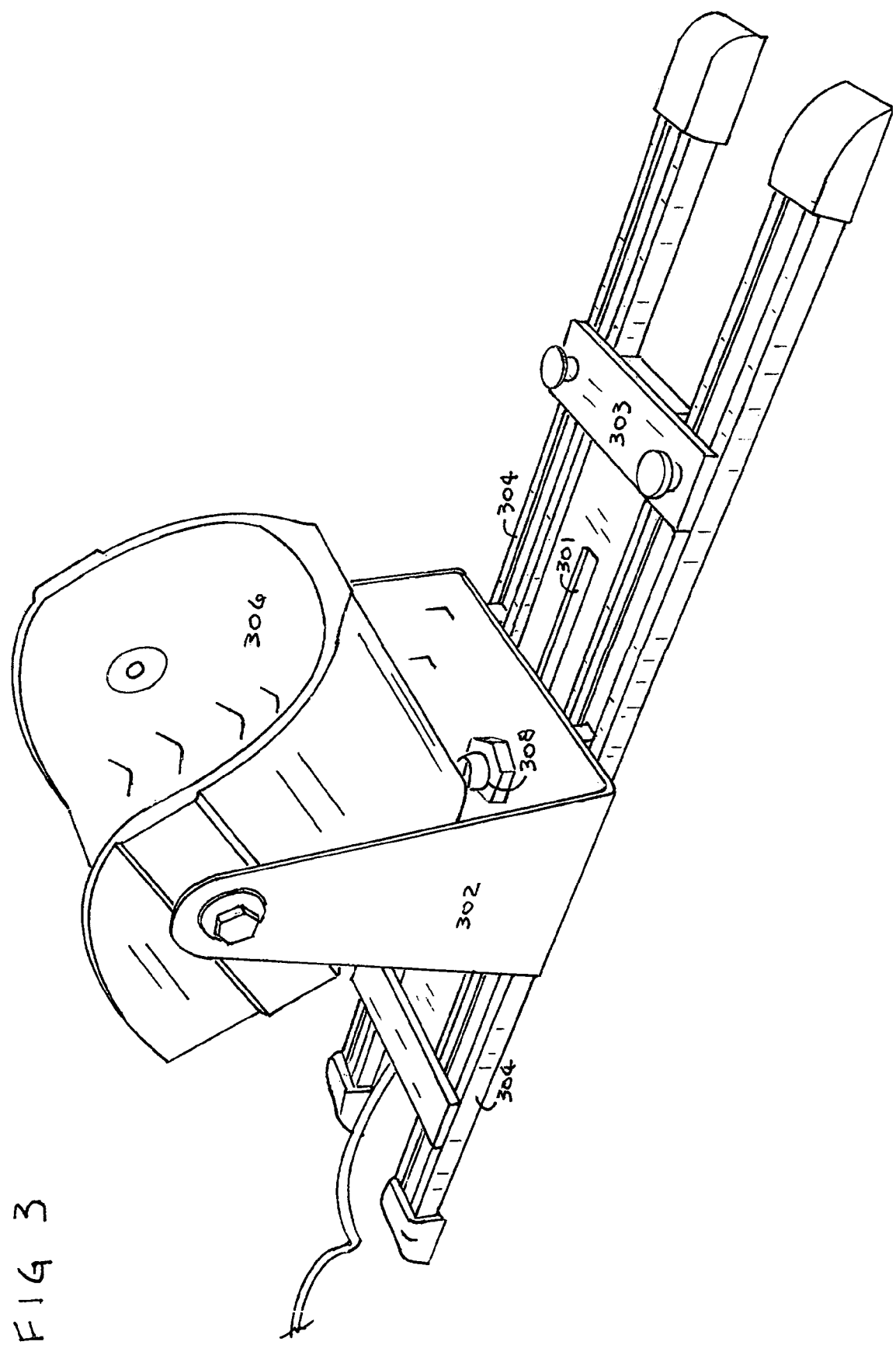
FIG. 3 is an enlarged view of a foot control means utilizing a forward/rearward motion of an operator's feet to provide input to a linear potentiometer mounted thereto.

In FIG. 3, the dual propulsion steering and control system of the present invention includes another variation of left or right foot receptacle 306, which pivots in bracket 302. This assembly glides forward and rearward along tracks 304 between the front and rear stops of potentiometer housing 303. Tracks 304 are fastened to a floor or deck of the watercraft 101. A linear potentiometer 301 is attached to housing 303. A transfer means 308 on bracket 302 makes contact with linear potentiometer 301, which in turn, inputs to a power regulating means, varying the power to the power conversion means and resulting in varying the thrust from the propulsion means. The pivoting ability of foot receptacle 306 within bracket 302 allows forward and rearward pivoting of the foot lessening the tendency for the heel to depart from the receptacle, even when the operator changes seating height and/or leg angle.

Figure 4:
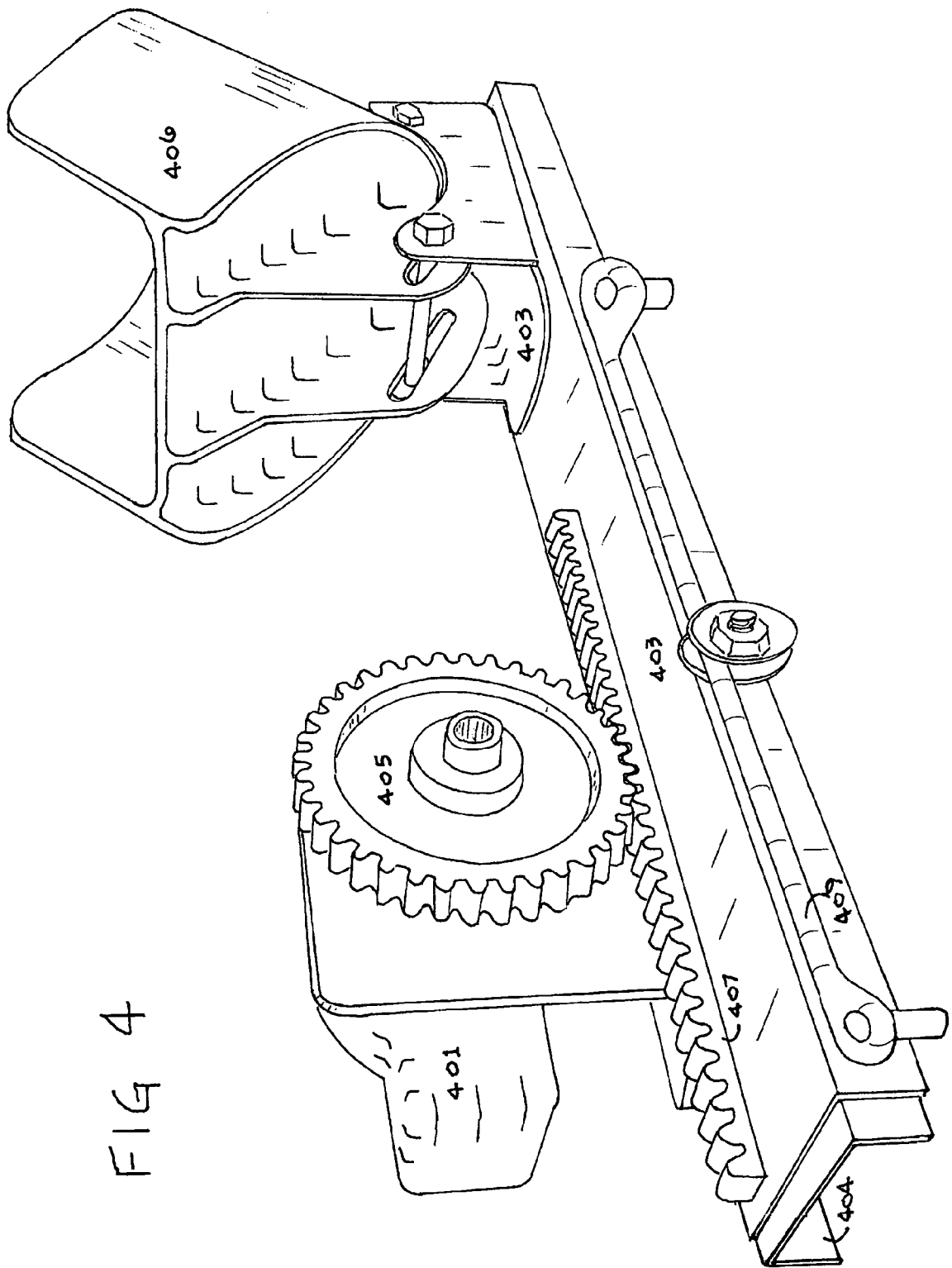
FIG. 4 is an enlarged view of a foot control means converting a forward/rearward motion to a rotary motion required to operate a typical power regulating means which is mounted thereto.

Alternately, FIG. 4 shows a spur gear 405 attached to the shaft of a common power regulating means 401 which is fastened to the floor or deck of watercraft 201. A multi-toothed rack 407 is attached to the surface 403 which glides along track 404. As the operator's foot, resting in a variation of foot receptacle 406, moves forward or rearward, the rack 407 rotates spur gear 405 which controls power regulating means 401. The foot receptacle 406 combined with parts 403, 404, 405, and 407 may also be considered a foot control means. An elastic material 409 is attached at fixed positions near each end of the track 404 and also attached approximately at the midpoint of the sliding surface 403 to bias the foot control means to a neutral position.

It should be noted that commonly available trolling motors come in a variety of voltages, multiple fixed speeds, variable speeds, and controls. Trolling motors with rotating tiller handles adapt well to this invention when the manufacturer's rotary power regulating means 401 is retained and the invention's foot control means converts its forward/rearward foot motion or pivotation to the rotary motion required.

Figure 5:
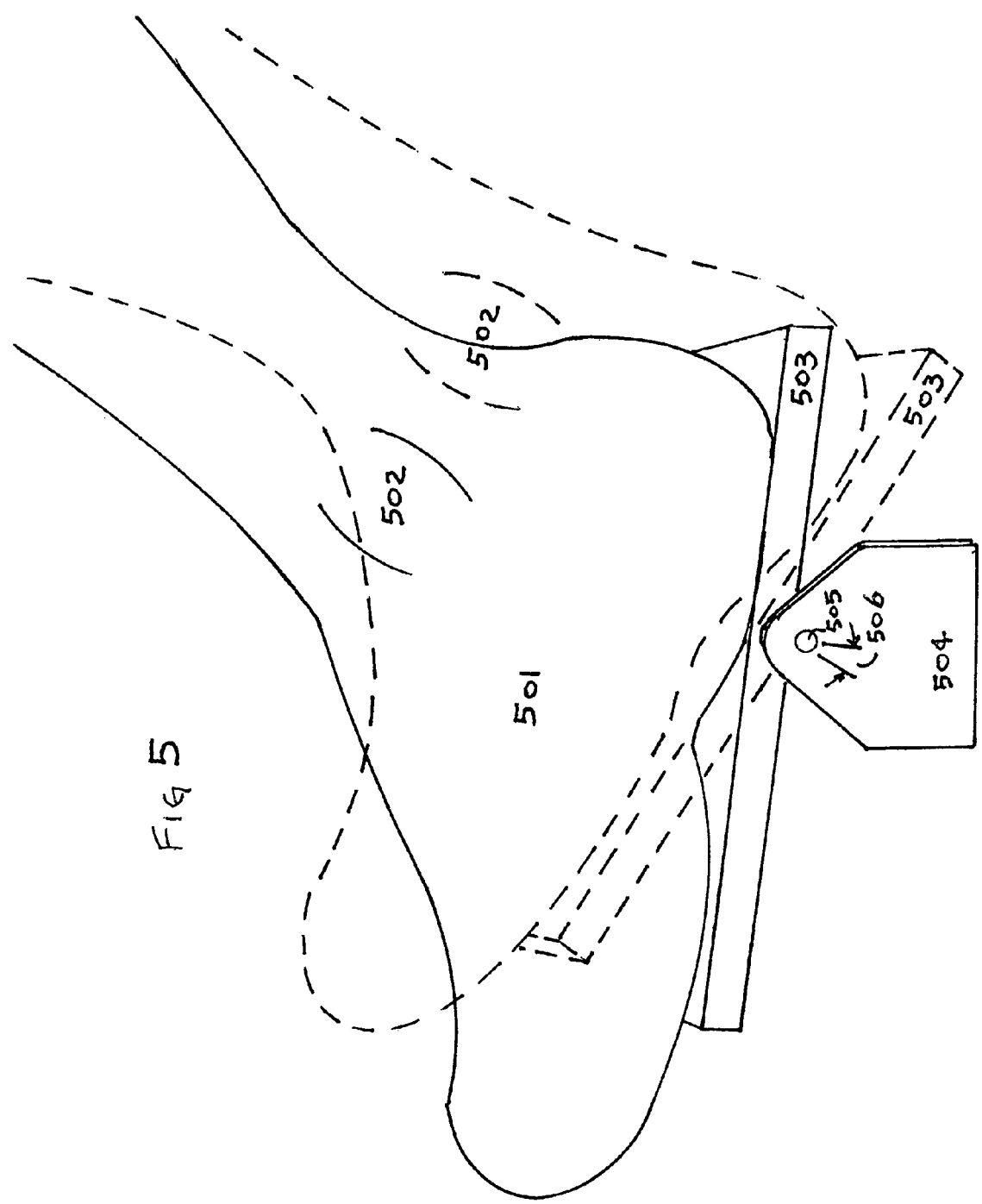
FIG. 5 shows the uncomfortable movement of an operator's foot using the foot pedal claimed in Lee's U.S. Pat. No. 5,131,875 which pivots under the foot.

In FIG. 5, an operator's foot 501 and foot pedal 503 are shown in solid line form to indicate the forward-most achievable pivotation from an operator's foot. The same foot 501 and foot pedal 503 are shown in broken line form to indicate the rearward-most achievable pivotation from an operator's foot. Note the uncomfortable travel of the operator's ankle 502 and the limited angle of rotation 506 resulting about axis 505.

Figure 6:
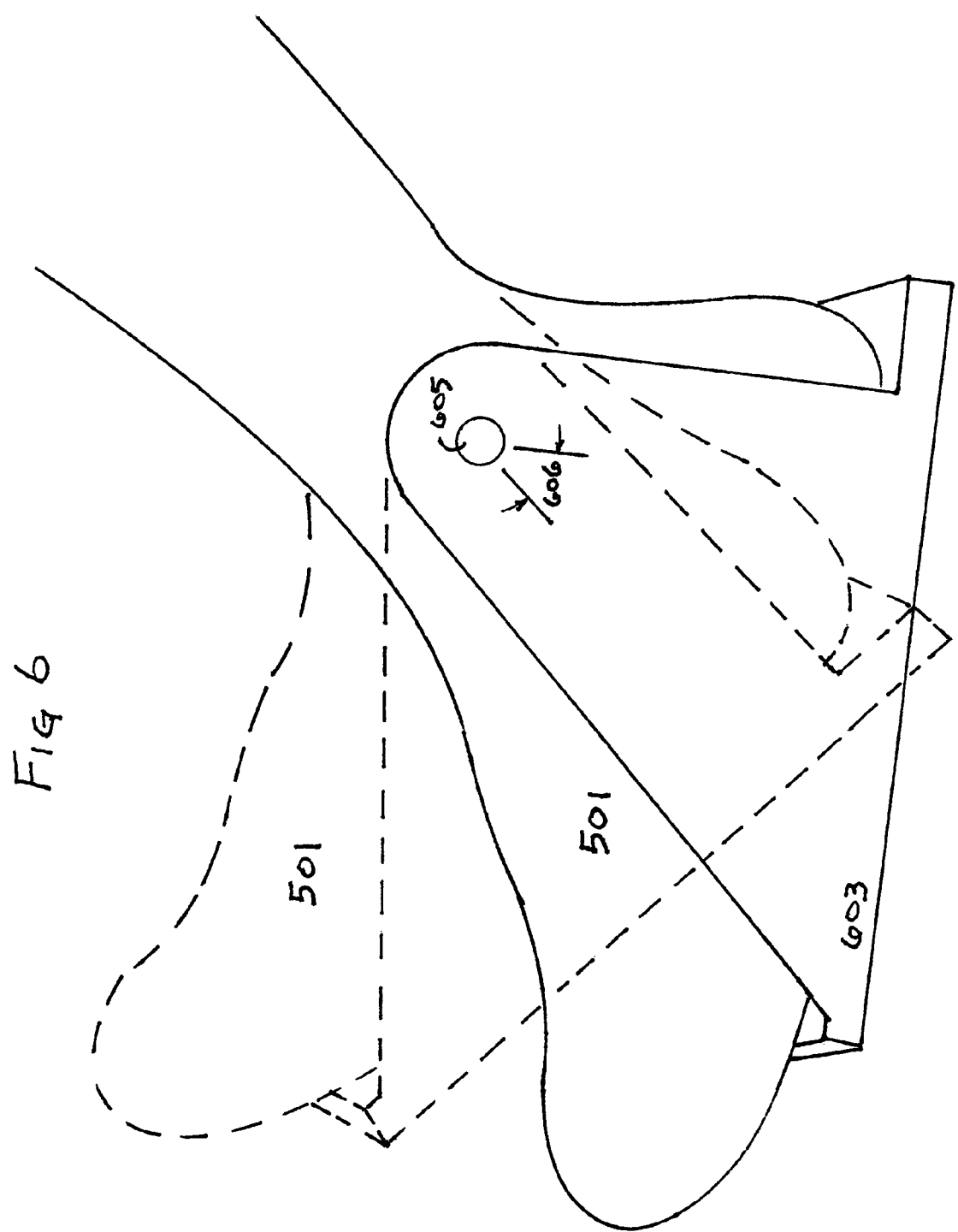
FIG. 6 shows the (claimed) ergonomically preferred pivotation of the foot control means near the operator's ankle which is superior to Lee's design (U.S. Pat. No. 5,131,875) in both comfort and range of motion and is included in this patent. Though not shown, a typical rotary power regulating means would be attached at pivot point 605 near the operator's ankle.

In FIG. 6, the operator's foot 501 rests on a more ergonomically designed foot pedal 603 which pivots about the more logical axis 605 which is generally aligned with operator's ankle 502. This arrangement provides approximately 60% more angle of rotation, shown as 606, than the arrangement shown in FIG. 5, and is significantly more comfortable for the operator. This arrangement also demonstrates sufficient difference from previous patents, especially U.S. Pat. No. 5,131,875. Note that the power regulating means is omitted from FIG. 5 and FIG. 6 for clarity of foot and leg positions. A power regulating means 401 of FIG. 4 may easily be attached and controlled by the pivoting motion of the operator's foot about axis 605.

FIG. 7 shows seat 108 in normal low seating position and also with seat back flipped forward to expose casting seat 701 for higher operator's seating position. In this higher position, the operator's legs and feet are in different angles from the low seating position. The pivoting foot receptacle in FIG. 3 enhances the operator's comfort in this higher position.

CONCLUSIONS, RAMIFICATIONS, AND SCOPE

It should also be noted that this dual propulsion steering and control system could be utilized on a variety of watercraft equipped with two propulsion units, each located on either side of the watercraft's centerline. The system is compatible with, but not limited to, electrically powered trolling motors, power converters, ducted propellers, impellers, centrifugal and axial pumps, paddles, screw drives, augers, and surface propellers. The system also functions well with potentiometers and other metering means attached to the foot control means for input to electronic variable speed controllers which vary the power from a power source to the power conversion means and propulsion means.

While the above description of a simple intuitive dual propulsion steering and control system contains many specificities, these should not be construed as limitations on the scope of the invention. Materials, sizes, shapes, and methods are merely demonstrations of a workable model.

What is claimed:

1. In a dual propulsion steering and control system for watercraft which includes a pair of propulsion means wherein separate mounting means are provided in a spaced relationship to one another for suspending the propulsion means on opposite sides of a centerline of the watercraft and wherein a power source is provided for individually energizing a pair of provided power conversion means individually connected to each propulsion means and wherein a pair of power regulating means are provided to individually vary the power from the power source to the power conversion means the improvement comprising, a pair of foot control means, first foot control means for manipulating the first of said power regulating means connecting said power source to the first of said power conversion means which drives the first of said propulsion means and second foot control means for manipulating the second of said power regulating means connecting said power source to the second of said power conversion means which drives the second of said propulsion means, each of said foot control means including a pedal having toe and heel portions, means for pivotally supporting each of said pedals so that each pedal is pivotable about a single axis taken generally perpendicular to an elongated axis extending between toe and heel portions of each pedal and significantly offset to be closer to an operator's ankle joint, said pedals being movable from a neutral position wherein neither of said toe or heel portions are depressed to a forward position wherein said toe position is depressed and a reverse position wherein said heel portion is depressed, each of said foot control means manipulating a power regulating means for activating and regulating power to said power conversion means resulting in a forward motion of the watercraft when said toe portion of said pedal is depressed, each of said foot control means controlling a power regulating means for activating and regulating power to said power conversion means resulting in a reverse motion of the watercraft when said heel portion of said pedal is depressed, each of said foot control means including power regulating means operable in response to the further depression of said toe or heel portions of said pedals to increase the power being supplied through said power regulating means to thereby increase the power from the power conversion means and thus the speed of said propulsion means in a forward or reverse direction when activated by said power regulating means whereby each of said foot control means controls a separate one of said propulsion means so that the direction of thrust of each said propulsion means as well as the speed of each said propulsion means is separately controlled.

2. The dual propulsion steering and control system of claim 1 in which each of said foot control means includes resilient means for biasing said pedals to said neutral position.

3. The dual propulsion steering and control system of claim 1 in which said foot control means includes a potentiometer or other metering means to supply input to a commonly available electronic variable speed controller which will alter the power from the power source to the power conversion means in order to vary the direction and amount of thrust from said propulsion means.

4. The dual propulsion steering and control system of claim 1 in which each of said propulsion means includes an auger having one or more helical flanges, also known as flighting.

5. The dual propulsion steering and control system of claim 1 which includes a seat for an operator, said seat includes a seat back which folds forward, said seat back includes a depression or cushion for operator to sit or rest upon thus offering a higher resting position than provided in said seat.

6. The dual propulsion steering and control system of claim 1 which includes a watercraft wherein a middle section of said watercraft contains, but is not limited to, said power regulating means, said power conversion means, and said propulsion means attached thereto, and also comprising bow and stern sections which attach to the middle section.

7. In a dual propulsion steering and control system for watercraft which includes a pair of propulsion means wherein separate mounting means are provided in a spaced relationship to one another for suspending the propulsion means on opposite sides of a centerline of the watercraft and wherein a power source is provided for individually energizing a pair of power conversion means individually connected to each propulsion means and wherein a pair of power regulating means are provided to individually vary the power from the power source to the power conversion means the improvement comprising, a pair of foot control means, first foot control means for manipulating the first of said power regulating means connecting said power source to the first of said power conversion means which drives the first of said propulsion means and second foot control means for manipulating the second of said power regulating means connecting said source of power to the second of said power conversion means which drives the second of said propulsion means, each of said foot control means including a foot receptacle, said foot receptacle being movable along a track or tracks from a neutral position wherein an operator's foot should reside in a fairly relaxed position, neither engaging the foot receptacle to a forward position wherein said foot receptacle is moved forward of the neutral position nor rearward of the neutral position to a reverse position, each of said foot control means manipulating each power regulating means for varying the power from the power source to each power conversion means and thus the thrust derived from the connected propulsion means for operating the watercraft in a forward direction when said foot receptacle is moved forward of the neutral position, each of said foot control means manipulating a power regulating means for activating said propulsion means in a reverse direction when said foot receptacle is moved rearward of the neutral position, each of said foot control means operable in response to the further forward or rearward movement of said foot receptacles to increase the power being supplied through each said power regulating means to thereby increase the thrust from said individual propulsion means in a forward or reverse direction when activated by said power conversion means whereby each of said foot control means controls a separate one of conversion means which is connected to a separate propulsion means so that the direction of thrust of each said propulsion means as well as the speed of each said propulsion means is separately controlled.

8. The dual propulsion steering and control system of claim 7 in which each of said foot control means includes resilient means for biasing said foot receptacles to said neutral position.

9. The dual propulsion steering and control system of claim 7 in which said foot control means provides proper connections between said power source and said power conversion means for each fixed forward and reverse speeds of typically available multiple fixed speed power conversion means.

10. The dual propulsion steering and control system of claim 7 in which said foot control means includes a potentiometer or other metering means to supply input to a commonly available electronic variable speed controller or power regulating means which will alter the power from the power source to the power conversion means in order to vary the direction and speed of said power conversion means.

11. The dual propulsion steering and control system of claim 7 in which said foot receptacle pivots slightly forward and rearward.

12. The dual propulsion steering and control system of claim 7 in which each of said propulsion means includes an auger having one or more helical flanges, also known as flighting.

13. The dual propulsion steering and control system of claim 7 which includes a seat for an operator, said seat includes a seat back which folds forward, said seat back includes a depression or cushion for operator to sit or rest upon presenting a higher resting position than provided in said seat.

14. The dual propulsion steering and control system of claim 7 which includes a watercraft wherein a middle section of said watercraft contains, but is not limited to, said power regulating means, said power conversion means, and said propulsion means attached thereto, and also comprising bow and stern sections which attach to the middle section.

15. In a dual propulsion steering and control system for watercraft which includes a power source, a pair of power conversion means, and a pair of power regulating means, wherein first of said power regulating means receives power from said power source and regulates said power to first of said power conversion means, second of said power regulating means receives power from said power source and regulates power to second of said power conversion means, the invention comprising a pair of augers having one or more helical flanges that are utilized as propulsion means, wherein separate fixed mounting means are provided in a spaced relationship to one another for suspending said augers in a fixed direction on opposite sides of a centerline of said watercraft, and wherein said power source is provided for individually energizing said power conversion means that are individually connected to each propulsion means, and wherein said pair of power regulating means further includes a pair of foot control means, first foot control means for manipulating the first of said power regulating means connecting said power source to the first of said power conversion means which drives the first of said propulsion means, and second foot control means for manipulating the second of said power regulating means connecting said power source to the second of said power conversion means which drives the second of said propulsion means, said pair of foot control means being provided to individually vary power from said power source to said power conversion means in order to control the forward and rearward direction, speed and steering of said watercraft.

16. The dual propulsion steering and control system of claim 15 which includes a pair of foot control means, first foot control means for manipulating the first of said power regulating means connecting said power source to the first of said power conversion means which drives the first of said propulsion means and second foot control means for manipulating the second of said power regulating means connecting said power source to the second of said power conversion means which drives the second of said propulsion means, each of said foot control means including a pedal having toe and heel portions, means for pivotally supporting each of said pedals so that each pedal is pivotable about a single axis taken generally perpendicular to an elongated axis extending between toe and heel portions of each pedal and significantly offset to be closer to an operator's ankle joint, said pedals being movable from a neutral position wherein neither of said toe or heel portions are depressed to a forward position wherein said toe position is depressed and a reverse position wherein said heel portion is depressed, each of said foot control means manipulating a power regulating means for activating and regulating power to said power conversion means resulting in a forward motion of the watercraft when said toe portion of said pedal is depressed, each of said foot control means controlling a power regulating means for activating and regulating power to said power conversion means resulting in a reverse motion of the watercraft when said heel portion of said pedal is depressed, each of said foot control means including power regulating means operable in response to the further depression of said toe or heel portions of said pedals to increase the power being supplied through said power regulating means to thereby increase the power from the power conversion means and thus the speed of said propulsion means in a forward or reverse direction when activated by said power regulating means whereby each of said foot control means controls a separate one of said propulsion means so that the direction of thrust of each said propulsion means as well as the speed of each said propulsion means is separately controlled.

17. The dual propulsion steering and control system of claim 15 which includes a pair of foot control means, first foot control means for manipulating the first of said power regulating means connecting said power source to the first of said power conversion means which drives the first of said propulsion means and second foot control means for manipulating the second of said power regulating means connecting said source of power to the second of said power conversion means which drives the second of said propulsion means, each of said foot control means including a foot receptacle, said foot receptacle being movable along a track or tracks from a neutral position wherein an operator's foot should reside in a fairly relaxed position, neither engaging the foot receptacle to a forward position wherein said foot receptacle is moved forward of the neutral position nor rearward of the neutral position to a reverse position, each of said foot control means manipulating each power regulating means for varying the power from the power source to each power conversion means and thus the thrust derived from the connected propulsion means for operating the watercraft in a forward direction when said foot receptacle is moved forward of the neutral position, each of said foot control means manipulating a power regulating means for activating said propulsion means in a reverse direction when said foot receptacle is moved rearward of the neutral position, each of said foot control means operable in response to the further forward or rearward movement of said foot receptacles to increase the power being supplied through each said power regulating means to thereby increase the thrust from said individual propulsion means in a forward or reverse direction when activated by said power conversion means whereby each of said foot control means controls a separate one of conversion means which is connected to a separate propulsion means so that the direction of thrust of each said propulsion means as well as the speed of each said propulsion means is separately controlled.

18. The dual propulsion steering and control system of claim 17 in which said foot control means provides proper connections between said power source and said power conversion means for each fixed forward and reverse speeds of typically available multiple fixed speed power conversion means.

19. The dual propulsion steering and control system of claim 17 in which said foot control means includes a potentiometer or other metering means to supply input to a commonly available electronic variable speed controller or power regulating means which will alter the power from the power source to the power conversion means in order to vary the direction and speed of said power conversion means.

20. The dual propulsion steering and control system of claim 17 in which said foot receptacle pivots slightly forward and rearward.

* * * * *